B. G. ANDERSON.
DRIVE MECHANISM FOR MOTOR CYCLES.
APPLICATION FILED JAN. 18, 1910.
985,877.
Patented Mar. 7, 1911.
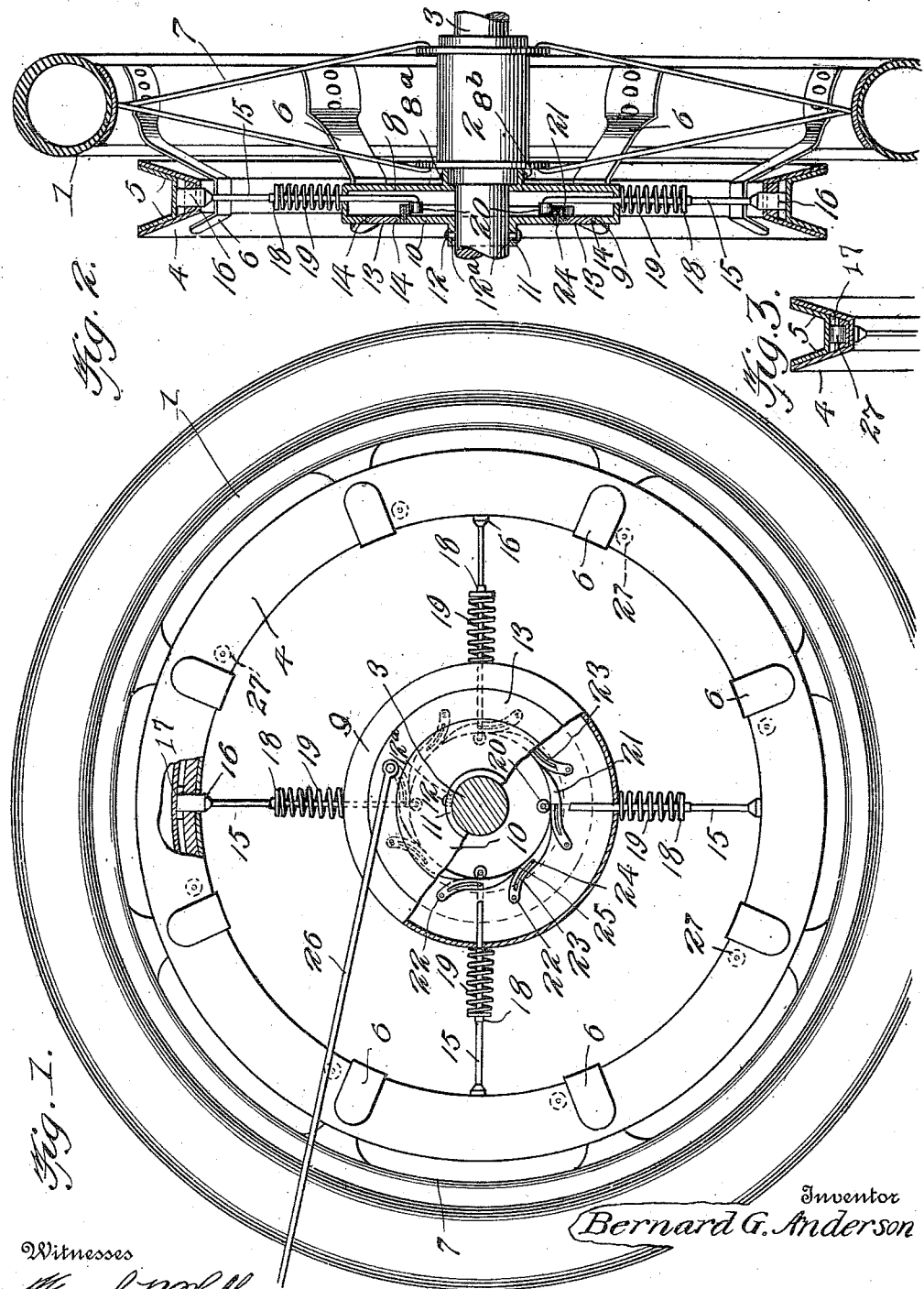
Witnesses
Frank B. Hoffman
C. C. Hines
Inventor
Bernard G. Anderson
By Victor J. Evans
Attorney
THE NORRIS PETERS CO., WASHINGTON, D. C.

UNITED STATES PATENT OFFICE.

BERNARD G. ANDERSON, OF APPOMATTOX, VIRGINIA.

DRIVE MECHANISM FOR MOTOR-CYCLES.

985,877. Specification of Letters Patent. Patented Mar. 7, 1911.

Application filed January 18, 1910. Serial No. 538,677.

*To all whom it may concern:*

Be it known that I, BERNARD G. ANDERSON, a citizen of the United States, residing at Appomattox, in the county of Appomattox and State of Virginia, have invented new and useful Improvements in Drive Mechanism for Motor-Cycles, of which the following is a specification.

This invention relates to drive mechanism for motorcycles, and particularly to a novel construction of drive pulley or wheel for the rear or driving wheel of the vehicle and clutch mechanism for rendering said pulley operative or inoperative for driving effect so that the driving action may be arrested at any time without stopping the motor.

The object of the invention is to provide a novel construction of driving mechanism of this character which will be effective in use, may be applied to any ordinary type of motorcycle, and is under the complete control of the operator.

The invention consists of the features of construction, combination and arrangement of parts hereinafter more fully described and claimed, reference being had to the accompanying drawing, in which:—

Figure 1 is a side elevation of the rear wheel of the motorcycle, showing the application of the invention thereto, the casing being partly broken away to disclose elements of the clutch mechanism. Fig. 2 is a central vertical transverse section through the wheel. Fig. 3 is a cross section through the drive pulley.

Referring to the drawing, 1 designates the rear driving wheel of a motorcycle, the hub 2 of which is mounted upon the rear shaft 3 for rotation therewith.

Arranged upon the outer side of the wheel 1 is a drive pulley comprising a fixed section 4 and a loose section 5. These sections are of channeled form, the loose section 5 being fitted within the channel of the fixed section and providing a groove of proper form to receive the drive belt leading from the shaft of the motor. The section 4 is rigidly secured to bracket arms 6 fastened to the rim 7 of the wheel 1.

Encompassing the end of the shaft 3 outwardly beyond the hub 2 is a casing 8 having at its inner side a flange 8ª secured to the adjacent end of the hub by one or more fastenings 8ᵇ, and having at its outer side an inturned annular flange 9 bounding an opening communicating with the interior of said casing. This opening is partially closed by a removable cover plate 10 having an outwardly extending collar 11 secured to the shaft 3 by one or more suitable fastenings 12. These fastenings pass through short slots 12ª in the flanges 11 to permit the cover plate to have a limited circumferential play to prevent strain upon the parts in the adjustment of the clutch devices, hereinafter described. Between this cover plate and the flange 9 is arranged a freely movable oscillatory actuating ring 13 coöperating with the plate to completely close the front of the casing against the entrance of dust and other foreign substance. Antifriction balls or bearing members 14 of any suitable type may be formed in raceways between the contiguous edges of the flange, cover plate and ring to permit the latter to have an easy oscillatory movement.

Slidably mounted in the peripheral wall of the casing is a series of rods 15 arranged at equal distances apart. These rods are provided at their outer ends with clutch dogs or plungers 16 movable through the inner or base wall of the fixed pulley section 4 and adapted to engage keeper recesses 17 formed in the inner side of the inner or base wall of the loose pulley section 5, by which the latter may be made fast to said fixed section 4 to communicate motion thereto from the drive belt to positively transmit power to the wheel 1. The recesses 17 are arranged at proper intervals apart to effect a locking action with the dogs or plungers when the latter are projected.

Each rod is provided at a point between the pulley and casing with a head or shoulder 18 against which bears one end of a coiled expansion spring 19 surrounding the rod and bearing at its opposite end against the casing, these springs acting to force the rods outward, whereby the dogs or plungers are projected. The inner ends of the rods are bent outward laterally to provide supporting spindles for friction rollers 20 bearing against alternate cams of an annular series of cams 21 arranged within the casing, each cam comprising a compoundly curved body pivotally connected at one (its outer) end, as at 22, to the ring 13 and having its opposite end engaging an adjacent cam, so that the cams throughout will be in bearing contact for movement in unison. Each cam is provided with a curved longitudinal slot 23 receiving a pin or projection 24 on the plate 10, by which the oscillation of said ring in one direction or the other will cause the highest surfaces 25 of the inner faces of said cams to be projected inwardly or outwardly in a radial direction toward or from the axle 3. When the cams are swung inwardly, corresponding motion will be imparted to the rods 15 to retract the dogs or plunger 16, by which the loose section 5 of the pulley will be released from the fixed section 4 thereof, allowing said section 5 to turn with the drive belt independent of the section 4, whereby the driving motion of the wheel 1 will be arrested without stopping the motor. When the cams are swung outwardly, the springs return the dogs or plungers to normal locking position, thus fixing the two pulley sections together for positively transmitting driving motion from the belt to the wheel 1. A controlling rod 26 is pivotally connected with the ring 13 and leads to a convenient point within reach of the rider by whom said ring may be shifted to adjust the cams inwardly and outwardly.

From the foregoing description, it will be seen that the pulley section 4 is fixed to the rim 7 of the wheel 1 by the brackets 6, while the pulley section 5 is free to revolve within the section 4 unless locked thereto by the plunger dog whereby the motorcycle may be stopped or permitted to coast without the necessity of stopping the motor, and that upon the projection of the locking dogs a positive driving action from the motor will be secured. As is apparent, the casing 8 is fixed to the pulley section 4 by the rods 15, while the ring 13 is permitted to have free independent motion for controlling the cams. Upon removing the fastening 12 the plate 10 may be detached for cleaning or repairs of the inclosed parts of the clutch mechanism. In the present instance I have shown the casing and parts applied when an armless form of coaster brake is used. Suitable modifications may be made to accommodate the arm of a Corbin or other type of armed coaster brake, such slight modifications as are necessary falling within the spirit and scope of the invention.

If desired, anti-friction rollers 27 may be interposed between the sections 4 and 5 of the driving element to allow the section 5 to have free movement. Also, if desired, the driving element may be in the form of a sprocket gear composed of fixed and revoluble sections, for use where a chain drive instead of a belt drive is employed.

I claim:—

1. In a drive gearing, a rotary driving element embodying a fixed section and a loose section revoluble on said fixed section, a support, slidable clutch devices carried by the support and fixed section of the driving element to engage and lock said loose section of the driving element to said fixed section, springs associated with said clutch devices for normally projecting the same, cams on the support movable to engage and effect the retraction of said clutch devices, an oscillatory member for adjusting said cams, and means for oscillating said member.

2. In a drive gearing, a rotary driving element embodying a fixed section and a loose section revoluble on said fixed section, a support, slidable clutch devices carried by the support and fixed section of the driving element to engage and lock said loose section of the driving element to said fixed section, springs associated with said clutch devices for normally projecting the same, cams pivotally mounted on the support and provided with slots, an oscillatory member having projections engaging said slots to adjust the cams for retracting the clutch devices, and means for operating the oscillatory member.

In testimony whereof I affix my signature in presence of two witnesses.

BERNARD G. ANDERSON.

Witnesses:
J. R. HORSLEY,
C. W. SMITH.

---

Copies of this patent may be obtained for five cents each, by addressing the "Commissioner of Patents, Washington, D. C."